United States Patent
Erimli

(12) 
(10) Patent No.: US 6,487,199 B1
(45) Date of Patent: Nov. 26, 2002

(54) METHOD AND APPARATUS FOR MAINTAINING RANDOMLY ACCESSIBLE COPY NUMBER INFORMATION ON A NETWORK SWITCH

(75) Inventor: Bahadir Erimli, Campbell, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/286,988

(22) Filed: Apr. 7, 1999

(51) Int. Cl.⁷ .............................................. H04L 12/26
(52) U.S. Cl. ...................... 370/360; 370/389; 370/412
(58) Field of Search ................................. 370/230, 360, 370/389, 422, 426, 412; 365/149

(56) References Cited

U.S. PATENT DOCUMENTS

| | | | | |
|---|---|---|---|---|
| 5,515,376 A | | 5/1996 | Murthy et al. ............... 370/402 |
| 5,953,335 A | * | 9/1999 | Erimli et al. ................ 370/412 |
| 6,058,112 A | * | 5/2000 | Kerstein et al. ............. 370/389 |
| 6,175,902 B1 | * | 1/2001 | Runaldue et al. ........... 370/230 |
| 6,256,256 B1 | * | 7/2001 | Rao ............................ 365/149 |
| 6,292,483 B1 | * | 9/2001 | Kerstein ...................... 370/389 |

* cited by examiner

Primary Examiner—Salvatore Cangialosi

(57) ABSTRACT

An apparatus for maintaining copy information pertaining to data frames received by a multiport switch that forwards received data frames to plural output ports includes a random access storage area and a control logic, both of which are located on the switch. The random access storage area stores a copy number that indicates the number of output ports that have not yet transmitted their copy of a designated data frame. The control logic addresses specific fixed locations within the random access storage area using frame pointers that identify where the received data frames are stored in an external memory. The information maintained in the random access storage area is accessible to all components of the multiport switch.

15 Claims, 9 Drawing Sheets

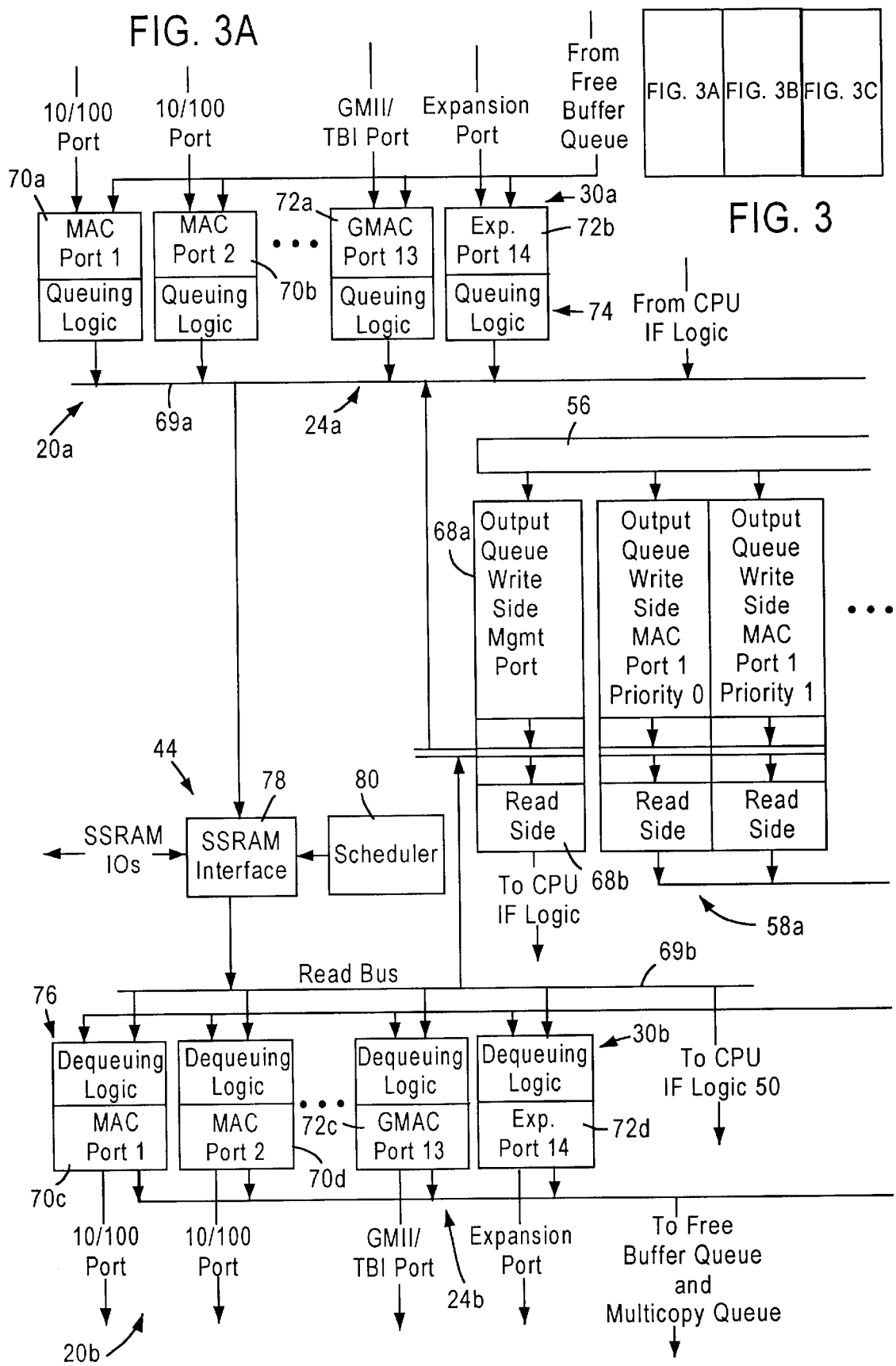

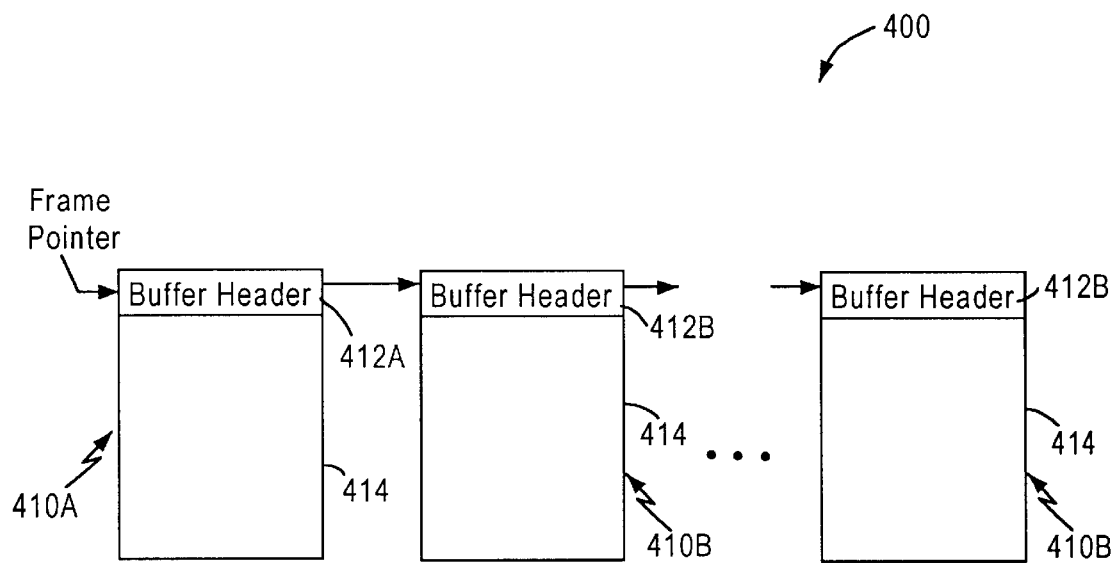
FIG. 4
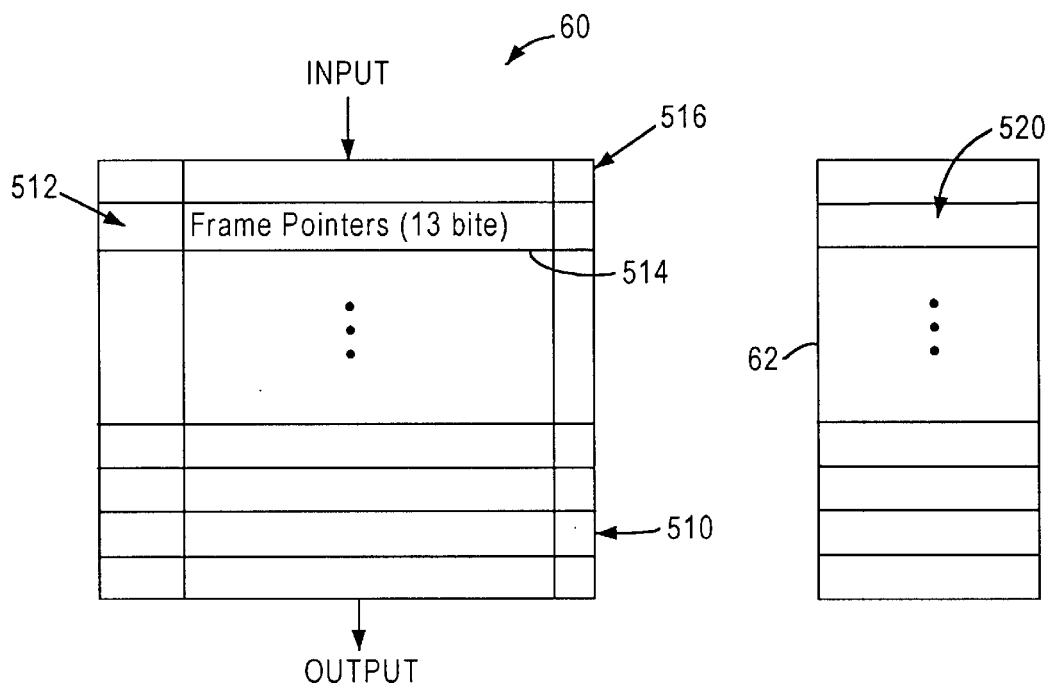
FIG. 5A
FIG. 5B

METHOD AND APPARATUS FOR MAINTAINING RANDOMLY ACCESSIBLE COPY NUMBER INFORMATION ON A NETWORK SWITCH

BACKGROUND OF THE INVENTION

1. Field of the Invention

The present invention relates to communication systems, and more particularly, to an apparatus that allows random access to information pertaining to the number of output ports that have transmitted copies of designated data frames.

2. Description of the Related Art

Modern communication systems, such as computer networking systems or communication networks, provide constant transmission of data between end stations and/or intermediate stations such as routers and signal amplifiers. Computer networking systems, such as packet switched networks (e.g., Ethernet networks), often require transmission of data to a single end station or to multiple end stations within the network. The data originates from a user program and is segmented into multiple data frames, and subsequently transmitted in order to simplify processing and minimize the retransmission time required for error recovery. For example, in a conventional e-mail system, a user may desire to send the same e-mail message to four different users that are connected to the e-mail system. Accordingly, the identical data would be directed to multiple end stations.

Packet switched computer networks typically employ a network switch that receives and forwards data frames to individual and/or multiple end stations. The network switch makes forwarding decisions upon receipt of data frames based on information contained in a header of the data frame. For example, if a received data frame is to be transmitted to a number of end stations, the switch must make the forwarding decision to forward the data frame to the ports of the correct end stations. Depending on the specific implementation and/or characteristic of the networking system (i.e., data transfer rate, traffic intensity, etc.), buffers must be provided for temporary storage of the data frames, received by the switch, until forwarding decisions can be made. The buffers used to store the data frames are often implemented as first in, first out (FIFO) queues.

Buffering the data as it is received allows, for example, robust error checking to be performed on the data frames, and also permits rate matching between transmitting and receiving ports. When data frames arrive at a network switch, only buffers that are currently available (i.e., "free") may be used to store the data frames, in order to prevent overwriting of a first data frame by a second data frame prior to transmission.

In systems that employ multiple buffers to store a single data frame, the network switch monitors the transmission of all data frames. In addition, it is often necessary to transmit multiple copies of the same data frame to different network stations. Such situations require that the network switch closely monitor the system to ensure that all copies of the data frame have been either transmitted or accounted for. The network switch may also include various components that maintain information regarding the number of copies of data frames that have been successfully transmitted. Therefore, it is necessary to continually update the status of all data frames that must be transmitted by multiple output ports. Depending on the specific implementation of the system, updating the status of such data frames can often be very time consuming, particularly when multiple components of the network switch maintain or use information pertaining to the number of output ports that have completed transmission of their copy of the data frame.

Based on the foregoing, a primary disadvantage associated with current methods of transmitting multiple copies of the same data within communication systems, such as a packet switched computer networking system, is the amount of time required to update multiple components of the switch with copy number information for multicast data frames.

DISCLOSURE OF THE INVENTION

There is a need for an arrangement that allows various components of a network switch to quickly obtain information regarding the number of copies of a received data frame remaining to be transmitted by various output ports of a network switch.

These and other needs are addressed by the present invention, wherein a multiport switch maintains copy information, pertaining to the number of copies of a received data frame that have been transmitted, in a random access storage area that may be accessed by various components of the multiport switch.

In accordance with one aspect of the present invention, an apparatus for maintaining copy information pertaining to data frames received by a multiport switch that forwards received data frames to plural output ports comprises: a random access storage area and a control logic, both of which are located on the chip. The random access storage area stores a copy information that indicates the number of output ports that have not yet transmitted their copy of a designated data frame. The control logic addresses locations within the random access storage area using frame pointers that identify where the received data frames are stored in an external memory. Each frame pointer includes at least two portions that are used by the control logic to address a specific row location and specific column location of a cell within the random access storage area where the copy number value of a designated data frame is stored. Depending on the specific implementation, the random access storage area can be configured to provide read access to all components of the multiport switch, while additionally providing write access to the control logic. The present arrangement advantageously minimizes the amount of time required to update copy number information for the multiport switch by storing the information in a random access storage area.

According to one embodiment of the present invention, the random access storage area is physically configured as a matrix containing 1,024 rows, and 8 columns that are 4-bits wide. In addition, each frame pointer is thirteen (13) bits long. The control logic uses the ten (10) most significant bits of the frame pointer to address the specific row location of cells within the random access storage area, and the three (3) least significant bits to address specific column location of cells within the random access storage area.

In accordance with another aspect of the present invention, a method of randomly accessing copy information for received data frames from a random access storage area of a multiport switch comprises the steps: retrieving a frame pointer that identifies the location of a designated data within an external memory area; decoding the retrieved pointer to indicate a specific row and specific column of the decoded cell of the random access storage area where a copy number value for the designated data frame is stored; and reading the copy number value stored in the decoded cell of the random access storage area. The present arrangement provides an efficient method for any and all components of the multiport switch to determine copy information regarding multicast data frames.

Additional advantages and novel features of the present invention will be set forth in part in the description which follows, and in part will become apparent to those skilled in the art upon examination of the following, or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 3A–3C are block diagrams illustrating in detail the switching subsystem of FIG. 2;

FIG. 4 is a block diagram illustrating a linked list data structure used to store received data frames in the external memory, according to an exemplary embodiment of the present invention;

FIG. 5A is a block diagram illustrating the internal structure of the multicopy queue;

FIG. 5B is a block diagram illustrating the internal structure of the random access storage area;

DETAILED DESCRIPTION OF ILLUSTRATIVE EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
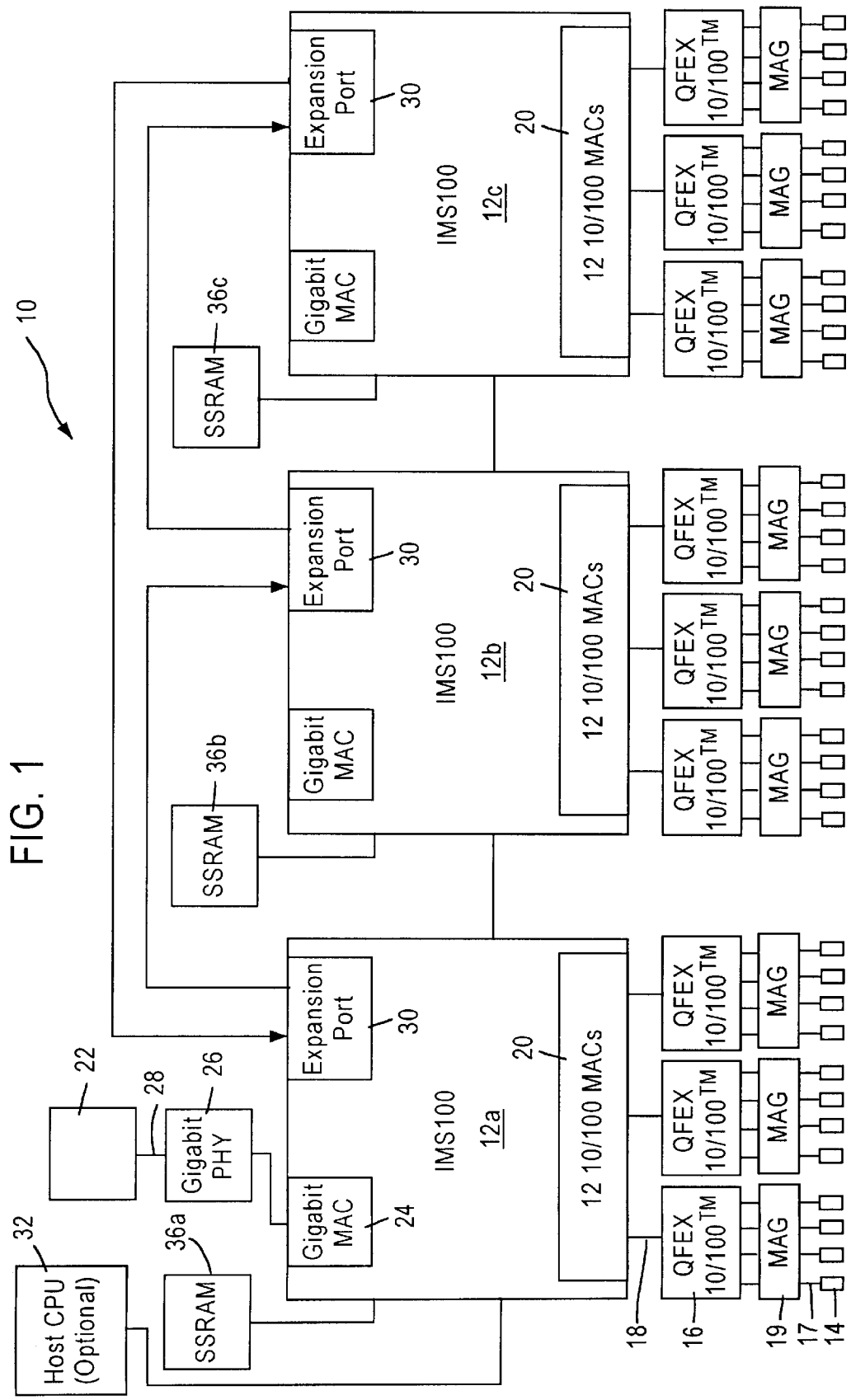
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
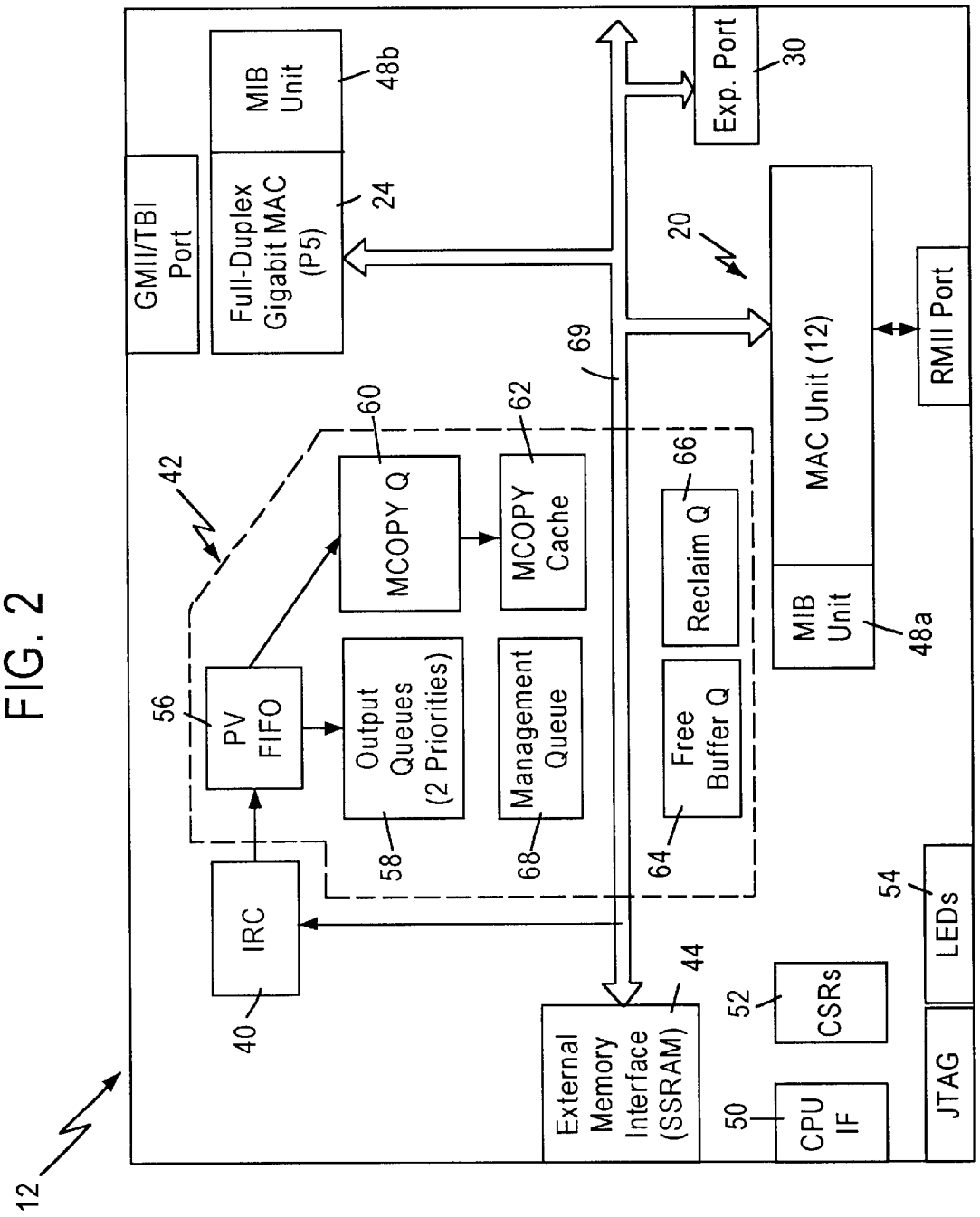
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data flame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
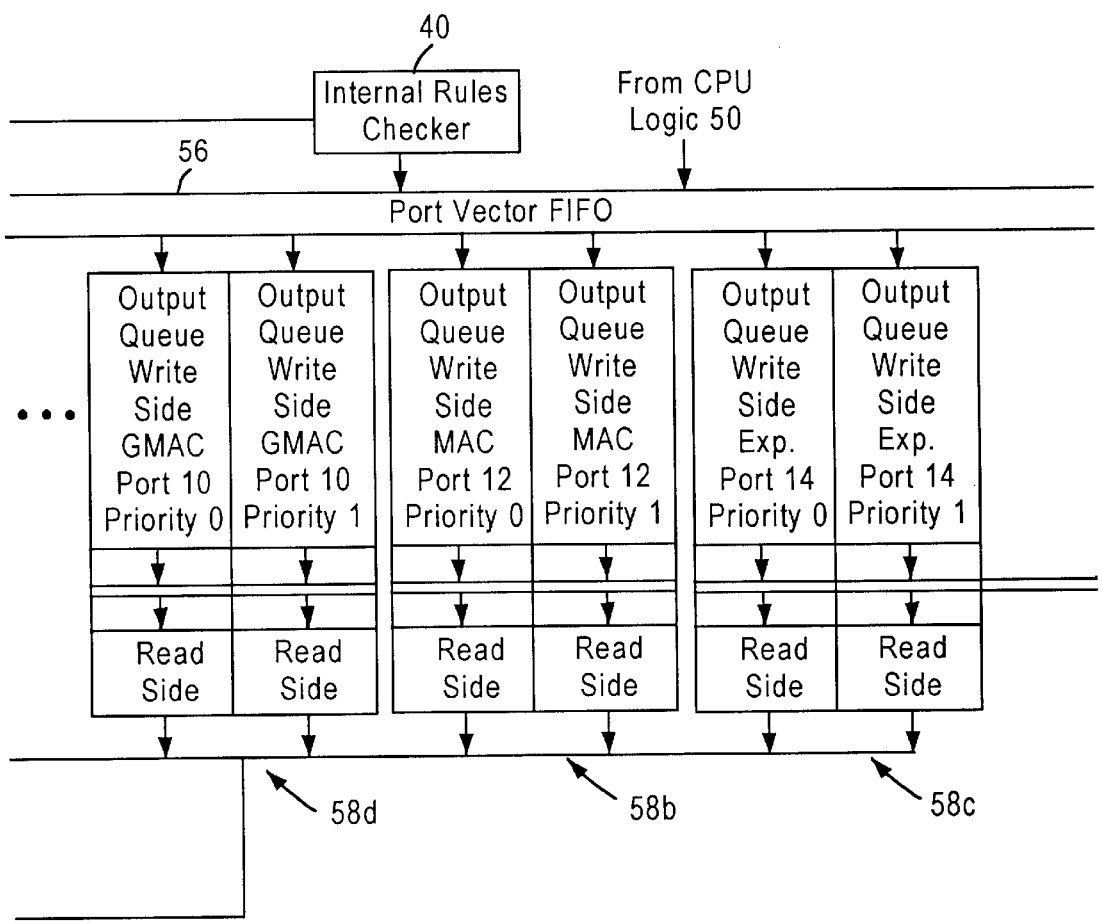
Figure 3C:
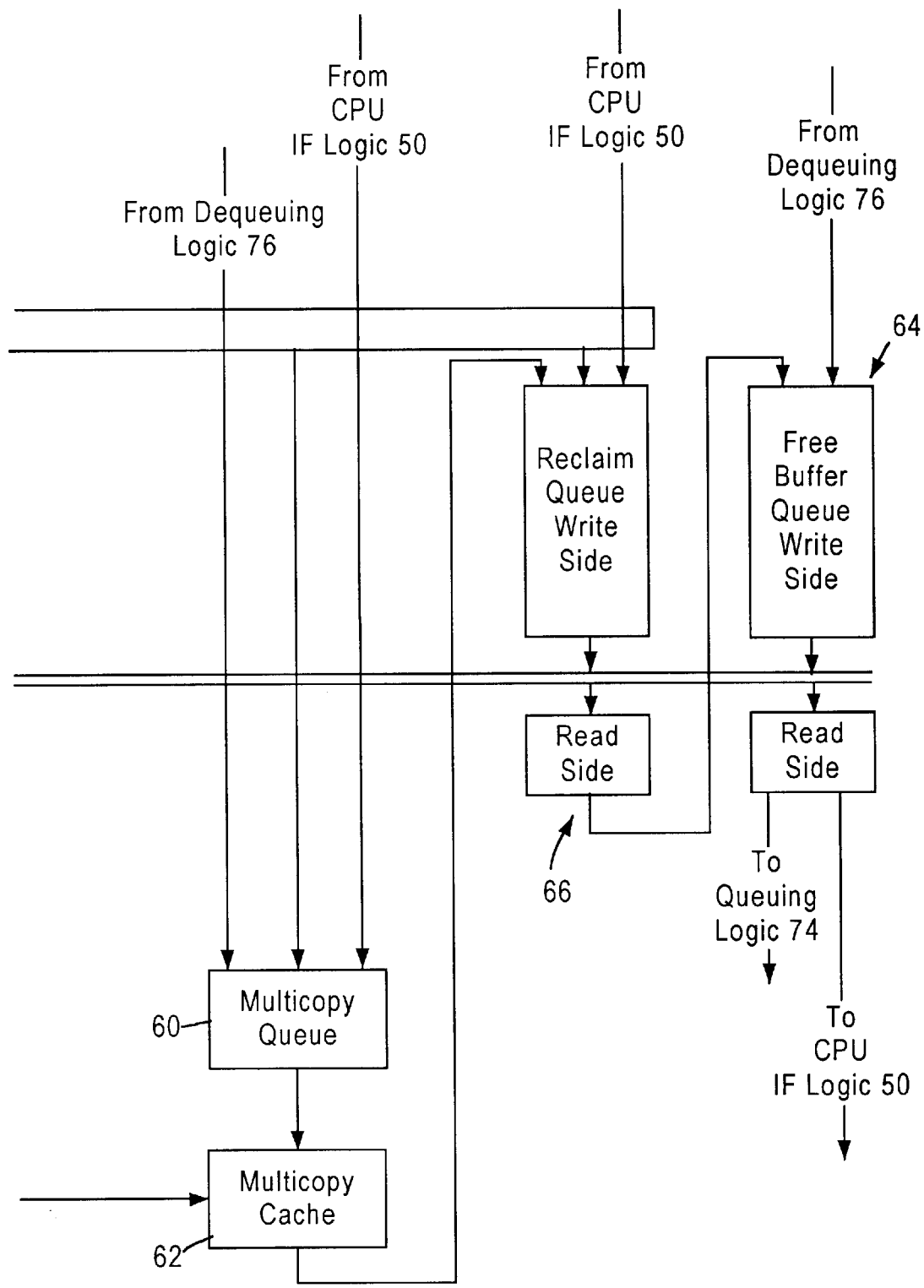

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the structure of frame buffers and various queues will be discussed, followed by the details for maintaining copy information pertaining to multicast data frames.

Buffer and Internal Queue Structure

FIG. 4 illustrates a linked list data structure 400 used to store received data frames in the external memory 36, according to an exemplary embodiment of the present invention. The linked list data structure 400 includes multiple frame buffers 410 that are linked together in order to store various-sized data frames. The frame buffers 410 used to create the linked list 400 illustrated in FIG. 4A are 256 bytes in length, although depending on the specific implementation of the present invention, buffer lengths of different sizes may be used.

As illustrated in FIG. 4, there are two different types of frame buffers, namely a "first" frame buffer 410A and a "subsequent" frame buffer 410B. As its name suggests, the first frame buffer 410A is either first in the linked list data structure 400, or the only frame buffer used to store the data frame. The subsequent frame buffers 410B correspond to all other frame buffers in the linked list data structure 400. Regardless of type, however, each frame buffer 410 (first or subsequent) includes a header portion 412 (e.g., buffer header) and a data portion 414. The buffer header 412 is 16 bytes in length, while the data portion 414 is 240 bytes in length. The buffer header 412 of each frame buffer 410 includes information, such as a pointer, that addresses a location in the external memory 36 where the next frame buffer 410 is located. The frame buffers 410 are linked together by address pointers, stored in each buffer header 412, that indicate the location of the next frame buffer 412 in the external memory 36. According to the exemplary embodiment illustrated in FIG. 4A, the pointer used to address the first frame buffer 410A is called a frame pointer. In certain preferred embodiments, this is the identical frame pointer that is used to identify data frames by the IRC, control queues, and output queues.

As data frames are received and processed by the multiport switch 12, the data normally is output to one or more of the output ports. According to the exemplary embodiment disclosed herein, rather than storing multiple copies of the received data frames, various data structures are used to identify and access the frame buffers that store the received data frames. The data structures are stored as entries and input into various queues. The queues are continually serviced such that all entries input into any particular queue will eventually be retrieved.

FIG. 5A illustrates an exemplary embodiment for the internal structure of the multicopy queue 60. The multicopy queue 60 is in the form of a single FIFO structure that has an input side and an output side. The multicopy queue 60 stores sixteen (16) entries 510. Each entry 510 includes three fields, namely a copy number field 512, a frame pointer field 514, and a single buffer field 516. The copy number field 512 is a 4-bit field that stores a value corresponding to the number of copies of the received data frame that must be transmitted. The frame pointer field 514 is a 13-bit field that stores the value of a frame pointer that addresses the location in the external memory 36 of the first frame buffer associated with the received data frame. The single buffer field 516 stores a value which indicates whether or not the received data frame is contained in a single frame buffer.

FIG. 5B illustrates an exemplary embodiment for the structure of the multicopy cache 62. The multicopy cache 62 is in the form of a randomly accessible cache memory. The multicopy cache 62 is capable of storing 8,192 entries 520 corresponding to the total number of frame pointers available in the external memory 36 at any given moment. Each entry 520 in the multicopy cache 62 is a 4-bit field that stores a value corresponding to the number of copies of the received data frame that must be transmitted. According to the illustrated embodiment, the entries 520 stored in the multicopy cache 62 correspond to the copy number field 512 of the multicopy queue 60.

Figure 6:
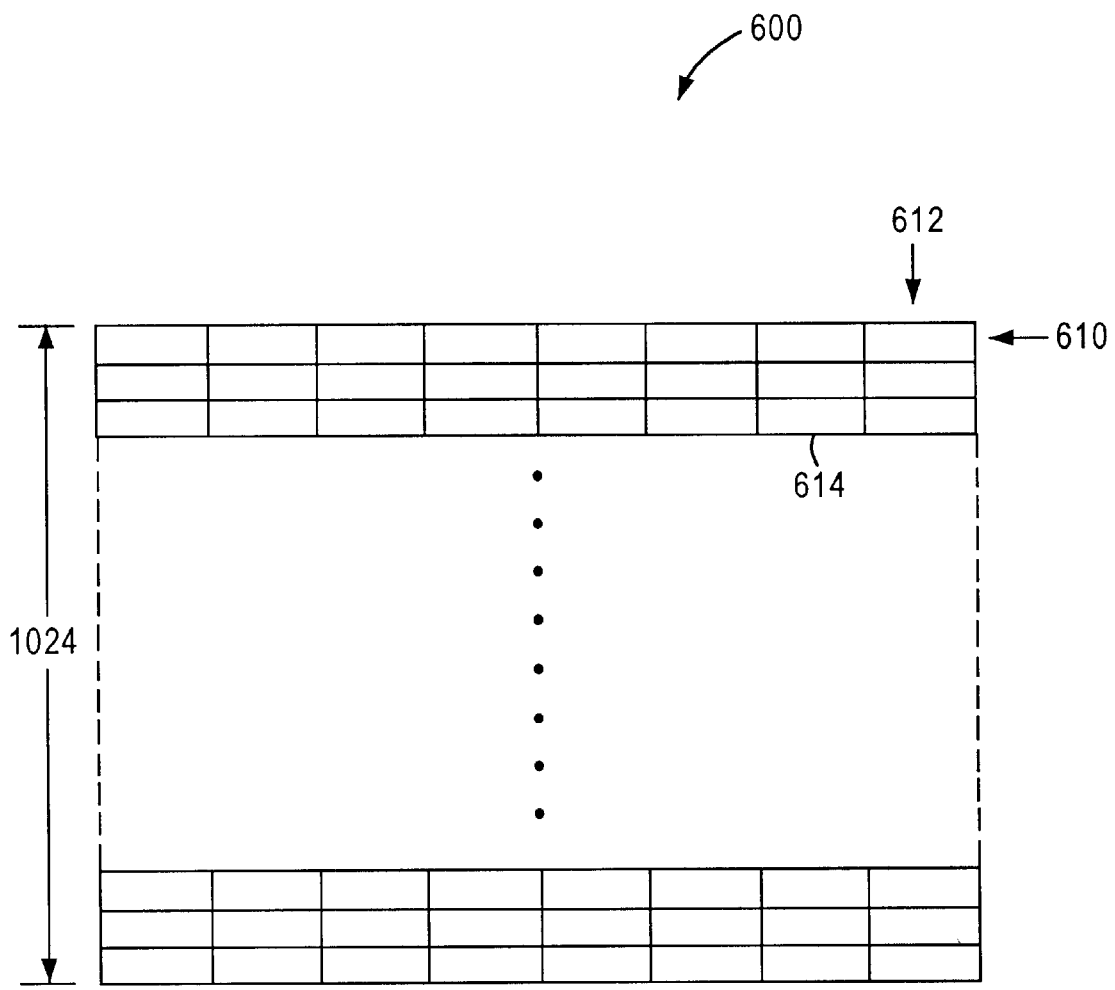
FIG. 6 is a block diagram illustrating an exemplary physical configuration for the random storage area illustrated in FIG. 5B.

FIG. 6 is a block diagram illustrating a random access storage area 600, according to an exemplary embodiment of the present invention. The random access storage area 600 corresponds to the physical implementation of the multicopy cache 62 according to the disclosed embodiment of the present invention. For example, the multicopy cache 62 is functionally represented as a single column structure wherein entries are sequentially organized by frame pointer. However, the physical organization of the memory used to implement the multicopy cache 62 is not necessarily in the form of 8,192 rows with each row containing a single entry.

Specifically, the physical organization of cells used to store entries (i.e., the random access storage area 600) can vary depending on specific implementations of the present invention. According to the disclosed embodiment, the random access storage area 600 is physically organized as a matrix of 1,024 rows 610 and 8 columns 612. The organization of the random access storage area 600 provides a total of 8,192 entries 614 which, in the disclosed embodiment of the invention, correspond to the total number of frame buffers available to the multiport switch 12 at any given point in time. Each entry 614 in the random access storage area 600 is four (4) bits in size and stores the value of a copy number corresponding to the number of copies of a data frame that have not been output by their designated output ports. Since the total number of entries 614 available in the random access storage area 600 corresponds to the total number of frame buffers available to the multiport switch 12, there exists a one-to-one correspondence therebetween. Hence, there is always a unique location within the random access storage area 600 that can be decoded based on the frame pointer used to address the first frame buffer used to store a data frame.

Maintaining Copy Information

Figure 7:
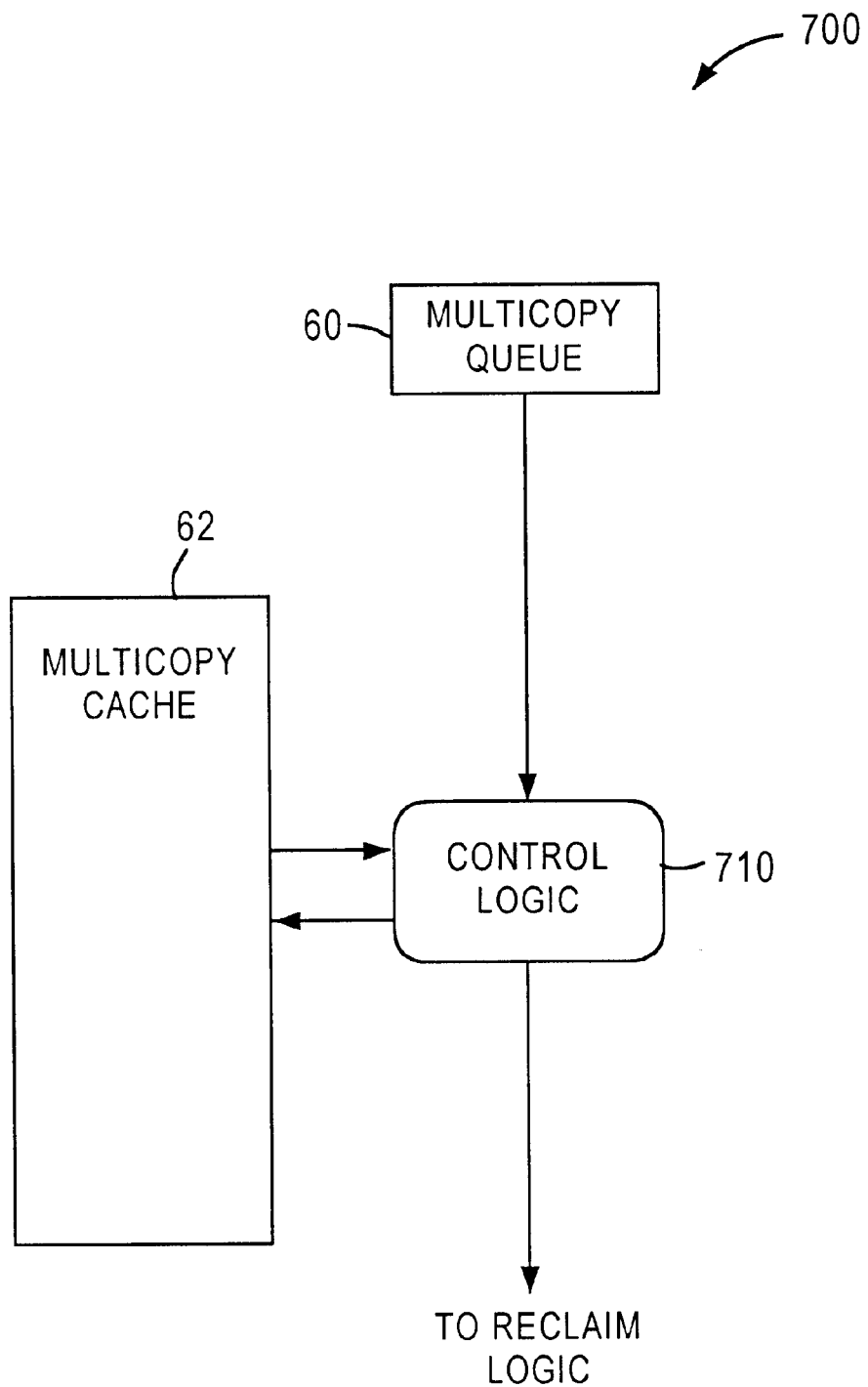
FIG. 7 is a block diagram illustrating an arrangement for maintaining copy information according to an exemplary embodiment of the present invention.

FIG. 7 illustrates a multicopy circuit 700 that is used to maintain copy information for the multiport switch 12, according to an embodiment of the present invention. The multicopy circuit 700 includes the multicopy queue 60, the multicopy cache 62, and control logic 710. The multicopy circuit 700 functions to retrieve entries from the multicopy queue 60, and maintain copy information pertaining to multicast data received data frames once all copies thereof have been transmitted by all designated output ports.

According to the disclosed embodiment of the present invention, the multicopy cache 62 is configured to store 8192 entries, and physically implemented in the form of a random access storage area 600 as illustrated in FIG. 6. This corresponds to the total number of frame pointers available to the multiport switch 12. Accordingly, the specific number of entries that the multicopy cache 62 is configured to store will depend on the amount of external memory 36 allocated by a particular system for storing frame pointers. The physical location of each cell 614 within the random access storage area 600 has a fixed, one-to-one correspondence with a particular frame pointer. Various decoding methodologies such as, for example, a hash function or table, may be used to convert an address specified by a frame pointer into the corresponding cell location within the random access storage area 600.

The control logic 710 performs the task of decoding the addresses specified by frame pointers. The control logic 710 first retrieves entries from the multicopy queue 60. These entries may be input to the multicopy queue 60 by various entities of the multiport switch 12 such as, for example, the port vector FIFO 56 or the dequeuing logic 76 associated with a particular output queue. As previously indicated, each entry 510 stored in the multicopy queue 60 contains 3 fields corresponding to a copy number, a frame pointer, and a single buffer bit. The control logic 710 accesses the value of the frame pointer from the retrieved entry and decodes the address specified by the frame pointer. The control logic 710 then searches the multicopy cache 62 to find the entry stored in the decoded address. While the searching of entries is described with respect to the multicopy cache 62, it should be understood that the actual search is physically performed in the random access storage area 600. The value of the entry (i.e., the copy number) stored in the decoded address is updated by the control logic 710 based on the copy number stored in the copy number field of the entry 510 retrieved from the multicopy queue 60.

The value stored in the copy number field of the entry retrieved from the multicopy queue 60 contains either the total number of output ports that will transmit a copy of the received data frame, or an indication that one of the output ports has successfully transmitted its copy of the received data frame. According to one embodiment of the present invention, if the value stored in the copy number field of the entry retrieved from the multicopy queue 60 is a positive integer, then the value corresponds to the total number of output ports that will receive a copy of the received data frame. A value of negative one (−1) indicates that one of the output ports has successfully transmitted its copy of the received data frame.

As previously stated, the control logic 710 updates the value stored at the decoded address within the random access memory area 600 based upon the copy number stored in the copy number field of the entry retrieved from the multicopy queue 60. If the copy number of the entry retrieved from the multicopy queue 60 specifies the total number of output ports that will receive the retrieved data frame, then the control logic 710 updates the multicopy cache 62 by storing the value of the copy number of the entry retrieved from the multicopy queue 60 into the physical address location decoded within the random access memory area 600. If the copy number of the entry retrieved from the multicopy queue 60 specifies that one of the output ports has successfully transmitted its copy of the received data frame, then the control logic 710 updates the multicopy cache 62 by decrementing the value stored therein by one.

For example, typical operating conditions dictate that, for a given data frame, the control logic 710 will first receive an entry from the multicopy queue 60 having a copy number that indicates the total number of output ports that will receive a copy of the received data frame. This value will be stored in the decoded address within the multicopy cache 62 (i.e., the random access memory area 600). Assume, for example, that this copy number is five. The next frame pointer decoded to the same address by the control logic 710 will include a copy number indicating that one of the output ports has successfully transmitted its copy of the received data frame (i.e., −1). Accordingly, the control logic 710 will decrement the value stored in the decoded address by one. Based on the previous example, the control logic 710 will decrement the copy number stored in the decoded address from five to four. The updated value at the decoded address thus correctly reflects the remaining number of output ports that have not completed transmission of their copy of the received data frame.

The control logic 710 continually updates the values in the multicopy cache 62 as each output port successfully transmits its copy of the received data frame. At some point in time, all output ports will normally have successfully transmitted their copy of the received data frame. The value stored in the multicopy cache 62 at this point in time should correctly reflect that all copies of the received data frame have been transmitted by the required output ports. According to the disclosed embodiment, this value will be zero. The control logic 710 then provides an indication to the multiport switch 12 that all copies of the received data frame have been transmitted and the frame buffers used to store this particular data frame may be reclaimed (i.e., released). Reclaiming the frame buffers allows the same frame buffers to be used for storing newly received data frames.

Figure 8:
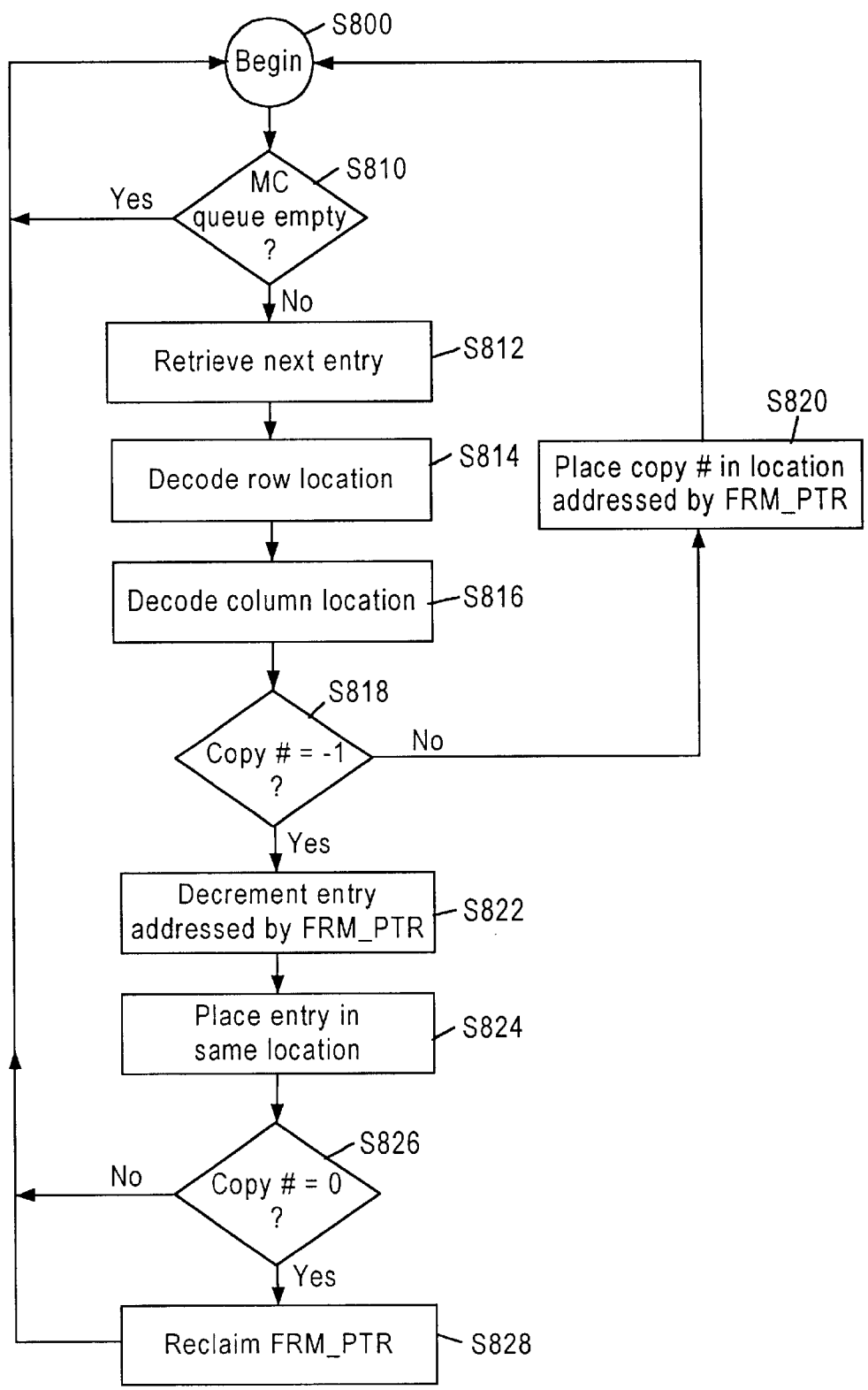
FIG. 8 is a flow chart illustrating the steps for maintaining copy information, according to an embodiment of the present invention.

FIG. 8 is a flow chart illustrating the steps performed by the multicopy circuit 700 while maintaining copy information in the multicopy cache 62. For purposes of explanation, the flow chart will be described with reference random access storage area 600 in order to provide a more thorough understanding of the process. It should be understood, however, that the random access storage area 600 is merely a physical implementation of the multicopy cache 62 according to the disclosed embodiment of the present invention.

The entire procedure begins at Step S800. The control logic 710 continually monitors the status of the multicopy queue 60 in order to determine if there are any entries present therein. This is illustrated by step S810 where the control logic 710 determines if the multicopy queue 60 is empty. If the multicopy queue 60 is empty, then the control logic 710 will continually repeat step S810 until at least one entry is input to the multicopy queue 60. When the control logic 710 determines that the multicopy queue 60 is no longer empty, then control passes to step S812. At step S812, the entry (or entries) present at the output portion of the multicopy queue 60 is retrieved by the control logic 710. In the next steps, the control logic 710 must now decode the frame pointer stored in the retrieved entry into an address within the random access storage area 600.

At step S814, the control logic 710 decodes the row location addressed by the frame pointer stored in the retrieved entry. According to one embodiment of the present invention, this is accomplished by examining a first portion of the frame pointer, i.e., the ten (10) most significant bits. Accordingly, each of the 1,024 physical rows of the random access storage area 600 can be uniquely addressed. At step S816, the column location addressed by the frame pointer is decoded. Step S816 is performed by examining the three least significant bits of the frame pointer to determine an appropriate column location within the random access storage area 600. The decoded address within the random access storage area 600 corresponds to a fixed, unique location associated with the retrieved frame pointer. In addition, various other methodologies such as, for example, a hash function, may be used to associate the frame pointer to a unique location (or cell) within the random access storage area 600.

At step S818, the value of the copy number field of the retrieved entry is examined. If the value of the copy number field does not equal negative one (−1), then the copy number specifies the total number of output ports that will transmit a copy of the received data frame and control passes to step S820. The control logic 710 places the value of the copy number stored in the retrieved entry in the decoded location of the random access storage area 600 specified by the frame pointer, and control returns to step S810. If the value of the copy number stored in the retrieved entry is equal to negative one (−1), then one of the output ports has successfully transmitted its copy of the received data frame and control passes to step S822. The control logic 710 accesses the decoded location in the random access storage area 600, and the copy number value stored in the decoded location is decremented by one. At step S824, the decremented value is stored back into the decoded location in the random access storage area 600.

Each time the control logic 710 decrements the value stored in the decoded location in the random access storage area 600, it must also determine if all copies of the received data frame have been successfully transmitted by the specified output ports. At step S826, the control logic 710 examines the value of the copy number stored at the currently decoded location of the random access storage area 600. If the value of the copy number stored in the random access storage area 600 is not equal to zero (0), then control returns to step S810 where it is determined if the next entry may be retrieved from the multicopy queue 60. If the value of the copy number stored in the random access storage area 600 is equal to zero (0), then all of the specified output ports have successfully transmitted their copy of the received data frame and control passes to step S828. At step S828, the frame pointer used to address the location of the data frame is reclaimed so that it may be reused to address the location of a newly received data frame. This may be accomplished, as previously stated, by forwarding the frame pointer to an appropriate reclaim logic that is responsible for ensuring that frame buffers and free buffer pointers are available to store data frames that arrive at the multiport switch 12.

The present invention provides an arrangement wherein copy information pertaining to the number of output ports that have not currently transmitted their copy of a received data frame (i.e., during multicast transmissions) can be readily accessed by all components of the multiport switch. The information is accurately maintained within the random access storage area, because each time an output port transmits its copy of the data frame, information is sent to the control logic. The control logic continually updates the status of random access storage area based on this information. The present arrangement advantageously provides an ability for any component of the multiport switch to read information stored in the random access storage area. Accordingly, any component of the multiport switch can readily obtain copy information corresponding to received data frames.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for maintaining copy information pertaining to data frames received by a multiport switch that forwards received data frames to plural output ports, the apparatus comprising:

a random access storage area having storage cells logically arranged in rows and columns, located on the multiport switch, for storing copy information indicating the number of copies of a designated data frame that have not yet been transmitted from one of said plural output ports; and control logic, located on the multiport switch, for addressing said random access storage area using frame pointers that also identify locations in an external memory where received data frames are stored, each said frame pointer including at least two portions decodable by said control logic to respectively indicate a specific row and specific column of the random access storage area at which the copy number value of a designated data frame is stored, wherein said control logic uses the ten most significant bits and 3 least significant bits of each frame pointer to respectively address the specific row and specific column of each cell in said random access storage area.

2. The apparatus of claim 1, wherein said random access storage area is configured to provide read access to all components of the multiport switch, and further provide write access to said control logic.

3. An apparatus for maintaining copy information pertaining to data frames received by a multiport switch that forwards received data frames to plural output ports, the apparatus comprising:

a random access storage area having storage cells logically arranged in rows and columns, located on the multiport switch, for storing copy information indicating the number of copies of a designated data frame that have not yet been transmitted from one of said plural output ports; and control logic, located on the multiport switch, for addressing said random access storage area using frame pointers that also identify locations in an external memory where received data frames are stored, each said frame pointer including at least two portions decodable by said control logic to respectively indicate a specific row and specific column of the random access storage area at which the copy number value of a designated data frame is stored, wherein said random access storage area includes a number of addressable locations that corresponds to a total number of frame buffer locations available to the multiport switch for storing received data frames.

4. An apparatus for maintaining copy information pertaining to data frames received by a multiport switch that forwards received data frames to plural output ports, the apparatus comprising:

a random access storage area having storage cells logically arranged in rows and columns, located on the multiport switch, for storing copy information indicating the number of copies of a designated data frame that have not yet been transmitted from one of said plural output ports;

control logic, located on the multiport switch, for addressing said random access storage area using frame pointers that also identify locations in an external memory where received data frames are stored, each said frame pointer including at least two portions decodable by said control logic to respectively indicate a specific row and specific column of the random access storage area at which the copy number value of a designated data frame is stored; and a multicopy queue configured to store entries that contain one of said frame pointers, and a copy number that specifies either a total number of output ports that will transmit a designated data frame or a successful transmission of a designated data frame by one of the output ports.

5. The apparatus of claim 4, wherein said control logic is configured to update said copy number values to accurately reflect the number of output ports that have not yet transmitted their copy of the designated data frame.

6. The apparatus of claim 5, wherein said control logic is configured to update said copy number values by performing the steps:

retrieving an entry from the multicopy queue;

retrieving the copy number value stored in a cell of the random access storage area having the specific row and specific column decoded from the frame pointer contained in the retrieved entry;

adding the value of the copy number contained in the retrieved entry to the copy number value stored in decoded cell of the random access storage area to obtain an updated copy number value; and if the updated copy number value is greater than zero, then storing the updated copy number value back into the decoded cell of the random access storage area.

7. The apparatus of claim 5, wherein said control logic is configured to update said copy number values by performing the steps:

determining whether the value of the copy number contained in an entry retrieved from the multicopy queue specifies the number of output ports which must transmit the designated data frame, or successful transmission of the designated data frame by one of the multiple output ports;

if the copy number contained in the retrieved entry specifies the number of output ports which must transmit the designated data frame, then storing the value of the copy number contained in the retrieved entry into the cell having the specific row and specific column decoded from the frame pointer contained in the retrieved entry; and if the copy number contained in the retrieved entry specifies successful transmission of the designated data frame by one of the multiple output ports, then performing the steps:

retrieving the copy number value stored in decoded cell of the random access storage area, decrementing the retrieved copy number value, and storing the decremented copy number value back into the decoded cell of the random access storage area.

8. The apparatus of claim 7, wherein said control logic is further configured to provide an indication that all copies of the designated data frame have been transmitted to the multiple output ports if the value stored in the decoded cell of the random access storage area is equal to zero.

9. The apparatus of claim 1, wherein said random access storage area includes a total of 8192 addressable cells.

10. The apparatus of claim 9, wherein each addressable cell in said random access storage area is 4 bits in size, and said random access storage area is physically arranged as a matrix containing 1024 rows and 8 columns.

11. A method of maintaining copy information pertaining to data frames received by a multiport switch that forwards received data frames to designated plural output ports, the method comprising the steps:

accessing a specific row and specific column of a cell within a random access storage area of the multiport switch wherein copy number information for received data frames is maintained, using frame pointers that also identify locations in an external memory where the received data frames are stored;

retrieving a copy number value for a designated data frame from the accessed cell;

updating the copy number value retrieved from the accessed cell to reflect the total number of designated output ports that have not transmitted their copy of the designated data frame; and storing the updated copy number value back into the accessed cell of the random access storage area, wherein the step of updating the copy number value includes the steps:

retrieving an entry from a multicopy queue that stores entries containing a frame pointer, and a copy number that specifies either a total number of output ports that will transmit the designated data frame or a successful transmission of the designated data frame by one of the output ports; and performing the step of updating the copy number value based on the copy number contained in the retrieved entry.

12. The method of claim 11, wherein the step of accessing comprises the steps:

decoding a specific row location of the cell using a first portion of the frame pointer; and decoding a specific column location of the cell using a second portion of the frame pointer.

13. The method of claim 11, further comprising the steps:

retrieving an entry from the multicopy queue;

retrieving the copy number value stored in a cell of the random access storage area having the specific row and specific column decoded from the frame pointer contained in the retrieved entry;

adding the value of the copy number contained in the retrieved entry to the copy number value stored in decoded cell of the random access storage area to obtain an updated copy number value; and if the updated copy number value is greater than zero, then storing the updated copy number value back into the decoded cell of the random access storage area.

14. The method of claim 11, further comprising the steps:
determining whether the value of the copy number contained in the retrieved entry specifies the number of output ports which must transmit the designated data frame, or successful transmission of the designated data frame by one of the multiple output ports;

if the copy number contained in the retrieved entry specifies the number of output ports which must transmit the designated data frame, then storing the value of the copy number contained in the retrieved entry into the accessed cell of the random access storage area; and if the copy number contained in the retrieved entry specifies successful transmission of the designated data frame to one of the multiple output ports, then performing the steps:

retrieving the copy number value stored in accessed cell of the random access storage area, decrementing the retrieved copy number value, and storing the decremented copy number value back into accessed cell of the random access storage area.

15. The method of claim 14, further comprising a step of providing an indication that all copies of the designated data frame have been transmitted to the multiple output ports if the value stored in the accessed cell of the random access storage area is equal to zero.

* * * * *